(12) United States Patent
Suzuki et al.

(10) Patent No.: US 9,077,920 B2
(45) Date of Patent: Jul. 7, 2015

(54) SOLID-STATE IMAGE PICKUP DEVICE, METHOD FOR DRIVING SOLID-STATE IMAGE PICKUP DEVICE, AND IMAGE PICKUP APPARATUS

(75) Inventors: Ryoji Suzuki, Kanagawa (JP); Takayuki Toyama, Kanagawa (JP); Koji Mishina, Kanagawa (JP); Hiroyuki Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 13/451,021

(22) Filed: Apr. 19, 2012

(65) Prior Publication Data

US 2013/0021511 A1 Jan. 24, 2013

Related U.S. Application Data

(63) Continuation of application No. 12/585,177, filed on Sep. 8, 2009, now Pat. No. 8,179,461.

(30) Foreign Application Priority Data

Nov. 28, 2008 (JP) ................................. 2008-303433

(51) Int. Cl.
*H04N 5/374* (2011.01)
*H04N 5/361* (2011.01)
*H04N 5/357* (2011.01)

(52) U.S. Cl.
CPC ............... *H04N 5/361* (2013.01); *H04N 5/374* (2013.01); *H04N 5/3572* (2013.01)

(58) Field of Classification Search
CPC ....................................... H04N 5/3741–5/3745
USPC ......................................... 348/294, 308, 311
See application file for complete search history.

(56) References Cited

U.S. PATENT DOCUMENTS

| 7,678,643 | B2 * | 3/2010 | Jeon ............................... 438/237 |
| 7,728,279 | B2 * | 6/2010 | Mauritzson ................. 250/214.1 |
| 8,143,626 | B2 * | 3/2012 | Lee ................................... 257/72 |
| 2005/0127411 | A1 * | 6/2005 | Ogawa et al. .................. 257/288 |
| 2006/0011952 | A1 * | 1/2006 | Ohkawa ......................... 257/291 |
| 2006/0186315 | A1 * | 8/2006 | Lee et al. ..................... 250/208.1 |
| 2006/0267053 | A1 * | 11/2006 | Yang et al. .................... 257/291 |
| 2007/0096168 | A1 * | 5/2007 | Jeon ............................... 257/274 |
| 2007/0108371 | A1 * | 5/2007 | Stevens et al. ............. 250/214.1 |

(Continued)

FOREIGN PATENT DOCUMENTS

| JP | 2005-303344 A | 10/2005 |
| JP | 2006-229799 A | 8/2006 |
| JP | 2008-091840 A | 4/2008 |

*Primary Examiner* — Roberto Velez
*Assistant Examiner* — Tuan Le
(74) *Attorney, Agent, or Firm* — Fishman Stewart Yamaguchi PLLC

(57) ABSTRACT

A solid-state image pickup device includes a pixel array section including an effective pixel region, an optical black pixel region, and a pixel region between the effective pixel region and the optical black pixel region; a vertical drive section which performs driving so that signals of pixels of the pixel region disposed at a side of the effective pixel region in a vertical direction are skipped and signals of pixels of the effective pixel region and the optical black pixel region are read; and a horizontal drive section which performs driving so that, from among the pixels selected by the vertical drive section, the signals of the pixels of the pixel region disposed at a side of the effective pixel region in a horizontal direction are skipped and the signals of the pixels of the effective pixel region and the optical black pixel region are read.

18 Claims, 7 Drawing Sheets

(56) References Cited

U.S. PATENT DOCUMENTS

| | | |
|---|---|---|
| 2007/0131991 A1* | 6/2007 | Sugawa .................. 257/292 |
| 2007/0235827 A1* | 10/2007 | Altice .................... 257/428 |
| 2007/0278536 A1* | 12/2007 | Adachi ................... 257/239 |
| 2008/0012975 A1* | 1/2008 | Sato et al. .............. 348/296 |
| 2008/0296645 A1* | 12/2008 | Itonaga .................. 257/294 |
| 2009/0050997 A1* | 2/2009 | Mutoh .................... 257/440 |
| 2009/0101914 A1* | 4/2009 | Hirotsu et al. ........... 257/72 |
| 2009/0179239 A1* | 7/2009 | Park et al. .............. 257/292 |
| 2009/0243025 A1* | 10/2009 | Stevens et al. .......... 257/461 |
| 2010/0148289 A1* | 6/2010 | McCarten et al. ........ 257/432 |

* cited by examiner

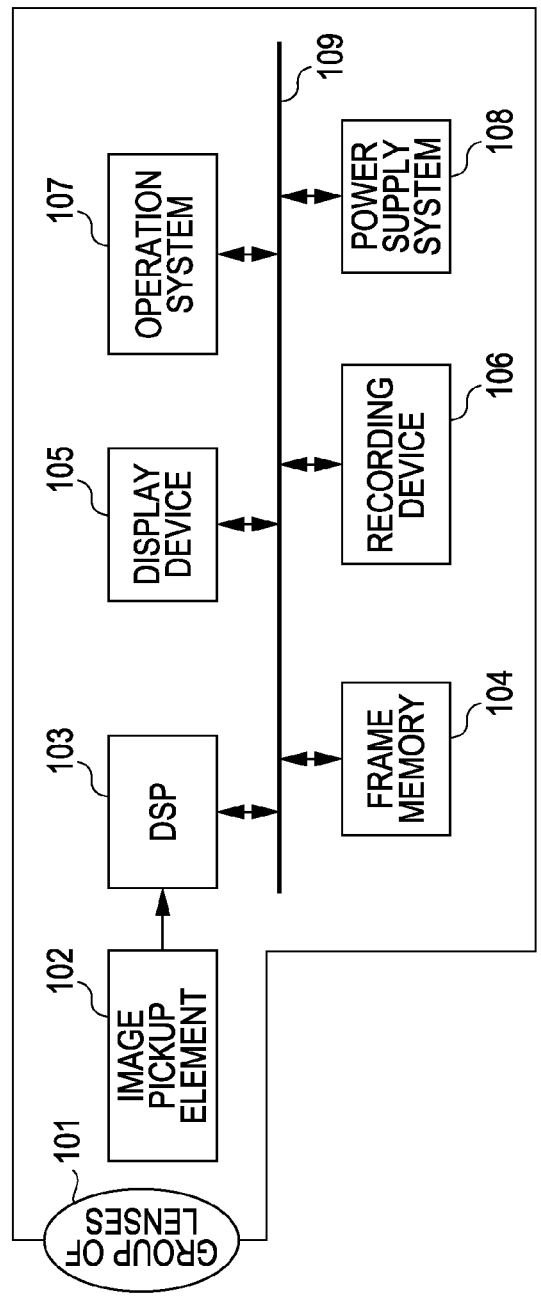

SOLID-STATE IMAGE PICKUP DEVICE, METHOD FOR DRIVING SOLID-STATE IMAGE PICKUP DEVICE, AND IMAGE PICKUP APPARATUS

CROSS REFERENCE TO RELATED APPLICATIONS

This is a Continuation Application of U.S. patent application Ser. No. 12/585,177, filed Sep. 8, 2009, which claims priority from Japanese Application No.: 2008-303433, filed on Nov. 28, 2008, the entire contents of which are incorporated herein by reference.

BACKGROUND OF THE INVENTION

1. Field of the Invention

The present invention relates to a solid-state image pickup device, a method for driving a solid-state image pickup device, and an image pickup apparatus.

2. Description of the Related Art

Typically, a solid-state image pickup device has a region having pixels, which are shielded from light, for outputting black reference signals (hereinafter, referred to as an "optical black pixel region") that is disposed around a region having effective pixels for providing signals which are eventually to be used as image signals (hereinafter, referred to as an effective pixel region).

In the solid-state image pickup device having the optical black pixel region, a layout of an upper layer of a light-shielding layer of a light-shielding portion of the optical black pixel region is different from a layout of the upper layer of the light-shielding layer of an opening portion of the effective pixel region. Accordingly, a film thickness of the upper layer of the light-shielding layer of a central portion of the effective pixel region is different from a film thickness of the upper layer of the light-shielding layer of a boundary portion between the effective pixel region and the optical black pixel region. Examples of the upper layer of the light-shielding layer include a passivation film, a color filter, a lens member, and so forth.

Because the difference in the film thickness of the upper layer of the light-shielding layer influences the optical characteristics, optical non-uniformity occurs in a peripheral portion of the effective pixel region. Furthermore, because of the difference between a shape of a light-shielding metal of the opening portion of the effective pixel region and a shape of the light-shielding metal of the optical black pixel region, variation in supplying of a hydrogen group from a passivation film to a silicon interface occurs. The interface state varies at the end of the silicon interface, and variation in dark current or random noise occurs.

In order to prevent the above-mentioned problems from occurring, hitherto, a configuration has been used: in which dummy pixels are disposed in the boundary portion between the optical black pixel region and the effective pixel region, i.e., a region in which the film thickness of the upper layer of the light-shielding layer differs; and in which signals of the dummy pixels are not used as image signals. Furthermore, in a charge coupled device (CCD) solid-state image pickup device, only when a frame interline scheme is employed, a configuration has been used: in which charge of dummy pixels that are provided at the top and bottom sides of an effective pixel region is drained into the outside of a horizontal transfer section, thereby reducing increase in transfer frequency (see Japanese Patent No. 3321787).

SUMMARY OF THE INVENTION

However, when the configuration in which dummy pixels are disposed is employed, the number of signals that are output is equal to or larger than the number of effective pixels for providing signals that are eventually to be used as image signals. Accordingly, it is necessary that the drive frequency be increased for the frame rate. Thus, there are disadvantages in terms of noise, power consumption, circuit area, and so forth.

Furthermore, although the CCD solid-state image pickup device is designed so that charge is not output from the dummy pixels which are disposed at the top and bottom sides of the effective pixel region, it is difficult to design the CCD solid-state image pickup device so that charge is not output from the dummy pixels which are disposed at the left and right sides of the effective pixel region. Additionally, because a technique for disposing dummy pixels can be used only when the frame interline scheme is employed, there is a disadvantage in terms of area.

Moreover, optical non-uniformity does not necessarily occur at all sides of the effective pixel region, and occurs at sides of the effective pixel regions on chips that are located at the periphery of a wafer in many cases. The reason for this is that a film of the upper layer of the light-shielding layer is formed using spin coating. When a step is designed so that the upper part of the step is located at the periphery of a chip, the film is significantly influenced by rotation. Accordingly, because it is necessary that the dummy pixels be disposed for all of the sides of the effective pixel region, and this leads to increase in chip area.

It is desirable to provide a solid-state image pickup device, a method for driving a solid-state image pickup device, and an image pickup apparatus which can reduce occurrence of optical non-uniformity in a peripheral portion of an effective pixel region without increasing of the drive frequency for the frame rate.

According to an embodiment of the present invention, there is provided a method for driving a solid-state image pickup device. The solid-state image pickup device includes a pixel array section. The pixel array section includes an effective pixel region with pixels for providing signals that are to be used as image signals; an optical black pixel region with pixels, which are shielded from light, for providing signals that are to be used as black reference signals; and a pixel region that is provided between the effective pixel region and the optical black pixel region and that has a light-shielding structure which is the same as a light-shielding structure of the effective pixel region. The method for driving the solid-state image pickup device includes performing driving so that signals of pixels of the pixel region which are disposed at a side of the effective pixel region in a vertical direction are skipped and signals of the pixels of the effective pixel region and the optical black pixel region are read; and performing driving so that, from among the pixels which are selected in the performing of driving so that the signals of the pixels are read, the signals of the pixels of the pixel region which are disposed at a side of the effective pixel region in a horizontal direction are skipped and the signals of the pixels of the effective pixel region and the optical black pixel region are read.

In the solid-state image pickup device including the effective pixel region and the optical black pixel region, a boundary portion between the effective pixel region and the optical black pixel region is a portion in which the optical characteristics are influenced by the difference in the film thickness of an upper layer of a light-shielding layer. The pixel region having a light-shielding structure that is the same as a light-shielding structure of the effective pixel region is provided in the boundary portion between the effective pixel region and the optical black pixel region, in which the optical characteristics are influenced, whereby occurrence of optical non-uniformity can be reduced in a peripheral portion of the effective pixel region. Furthermore, the signals of the individual pixels of the pixel region are skipped without being selected, thereby outputting only signals which are eventually to be used as image signals and the number of which is equal to the number of elective pixels. Thus, it is not necessary that the drive frequency be increased for the frame rate.

According to the embodiment of the present invention, occurrence of optical non-uniformity can be reduced in the peripheral portion of the effective pixel region without increasing of the drive frequency for the frame rate.

BRIEF DESCRIPTION OF THE DRAWINGS

FIG. 9 is a block diagram showing an example of a configuration of an image pickup apparatus according to an embodiment of the present invention.

DESCRIPTION OF THE PREFERRED EMBODIMENTS

Hereinafter, preferred embodiments (hereinafter, referred to as "embodiments") will be described in detail with reference to the accompanying drawings. Note that the embodiments will be described in the order of section headings as follows:

1. Solid-State Image Pickup Device According to Embodiment of Present Invention 1-1. System Configuration 1-2. Characteristic Portion of Embodiment 1-3. First Embodiment 1-4. Second Embodiment 2. Modification Examples 3. Application Examples (Image Pickup Apparatus)

1. Solid-State Image Pickup Device According to Embodiment of Present Invention 1-1. System Configuration FIG. 1 is a diagram of a system configuration, which schematically shows a configuration of a solid-state image pickup device according to an embodiment of the present invention, e.g., a CMOS image sensor that is one type of X-Y address solid-state image pickup device.

Figure 1:
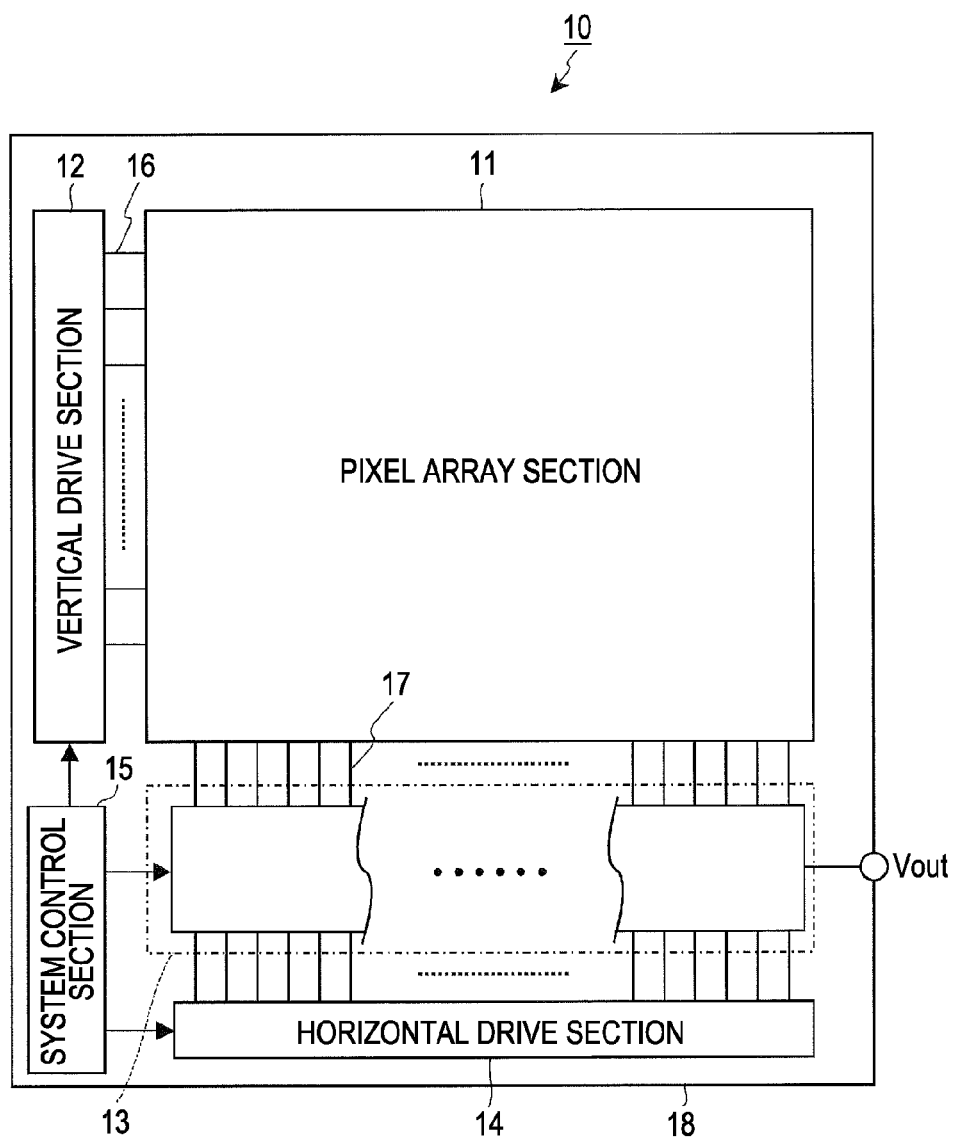
FIG. 1 is a diagram of a system configuration, which schematically shows a configuration of a complementary metal-oxide-semiconductor (CMOS) image sensor according to an embodiment of the present invention.

As shown in FIG. 1, a CMOS image sensor 10 according to an embodiment includes a pixel array section 11, which is formed on a semiconductor substrate (a chip) 18, and peripheral circuit sections, which are integrated on the semiconductor substrate 18 as in the case of the pixel array section 11. As the peripheral circuit sections, for example, a vertical drive section 12, a column processing section 13, a horizontal drive section 14, and a system control section 15 are provided.

In the pixel array section 11, unit pixels (not illustrated) (hereinafter, simply referred to as "pixels" in some cases), each of which includes a photoelectric conversion element that performs photoelectric conversion to convert incident visible light to photocharge so that the amount of the photocharge will be determined in accordance with the amount of the visible light, are two-dimensionally arranged in a matrix form. The specific configuration of each of the unit pixels will be described below.

In the pixel array section 11, for arrangement of the pixels in a matrix form, each of pixel drive lines 16 is formed for a corresponding one of rows along the left and right directions (directions in which the pixels are arranged in pixel rows/the horizontal directions) in FIG. 1. Each of vertical signal lines 17 is formed for a corresponding one of columns along the top and bottom directions (directions in which the pixels are arranged in pixel columns/the vertical directions) in FIG. 1. In FIG. 1, although the number of pixel drive lines 16 is one, the number is not limited to one. An end of each of the pixel drive lines 16 is connected to an output terminal of the vertical drive section 12 that is provided for a corresponding one of the columns.

The vertical drive section 12 is configured using a shift register, an address decoder, and so forth. Here, the specific configuration of the vertical drive section 12 is not illustrated. However, the vertical drive section 12 includes a read-scanning system and a sweeping-out-scanning system. The read-scanning system performs a read-scanning operation of sequentially selecting, in units of rows, the unit pixels from which signals will be read.

On the other hand, the sweeping-out scanning system performs, on a row on which a read-scanning operation is to be performed by the read-scanning system, a sweeping-out scanning operation of sweeping out unnecessary charge from the photoelectric conversion elements of the unit pixels of the row (of resetting the photoelectric conversion elements) at a time that is a shutter speed earlier than a time at which the read-scanning operation is performed. A so-called electronic shutter operation is performed using the sweeping-out scanning operation of sweeping out unnecessary charge (using resetting) with the sweeping-out-scanning system. Here, the electronic shutter operation is an operation in which photocharge is drained from the photoelectric conversion elements, and in which exposure newly starts (accumulation of photocharge starts).

Signals that are read by the read-scanning operation performed by the read-scanning system are provided in accordance with the amounts of light that has entered after the previous read-scanning operation or an electronic shutter operation was performed. A period from a time at which signals are read by the previous read-scanning operation or from a time at which charge is swept out by the electronic shutter operation to a time at which signals are read by the current read-scanning operation is an accumulation time (an exposure time) in which photocharge is accumulated in the unit pixels.

Each of signals that are output from the individual unit pixels of a pixel row that is selected by a vertical scanning operation performed by the vertical drive section 12 is supplied to the column processing section 13 via a corresponding one of the vertical signal lines 17. The column processing section 13 performs, for each of the pixel columns of the pixel array section 11, predetermined signal processing on an analog pixel signal that is output from a corresponding one of the unit pixels 20 of the selected pixel row.

Examples of the signal processing that is performed by the column processing section 13 include a CDS process. In the CDS process, reset levels and signal levels that are output from individual pixels of a selected row are read, and the differences between the reset levels and the signal levels are obtained, thereby obtaining signals of the pixels of one row. Also in the CDS process, fixed pattern noise of the pixels is removed. The column processing section 13 may have an analog-to-digital (AD) conversion function of converting an analog pixel signal to a digital signal. In other words, the column processing section 13 has at least one of a noise reduction function and the AD conversion function.

The horizontal drive section 14 is configured using a shift register, an address decoder, and so forth. The horizontal drive section 14 performs a horizontal scanning operation of sequentially selecting circuit portions of the column processing section 13 that correspond to the pixel columns. Pixel signals that have been subjected to signal processing in unit of pixel rows by the column processing section 13 are sequentially output by the horizontal scanning operation, which is performed by the horizontal drive section 14, of selecting pixels.

The system control section 15 receives a clock signal supplied from a unit that is provided outside the semiconductor substrate 18, data for specifying an operation mode, and so forth. Furthermore, the system control section 15 outputs data such as internal information concerning the CMOS image sensor 10. The system control section 15 further includes a timing generator that generates various types of timing signals, and performs control of driving the vertical drive section 12, the column processing section 13, the horizontal drive section 14, and so forth in accordance with the various types of timing signals that are generated by the timing generator.

Circuit Configuration of Unit Pixel

Figure 2:
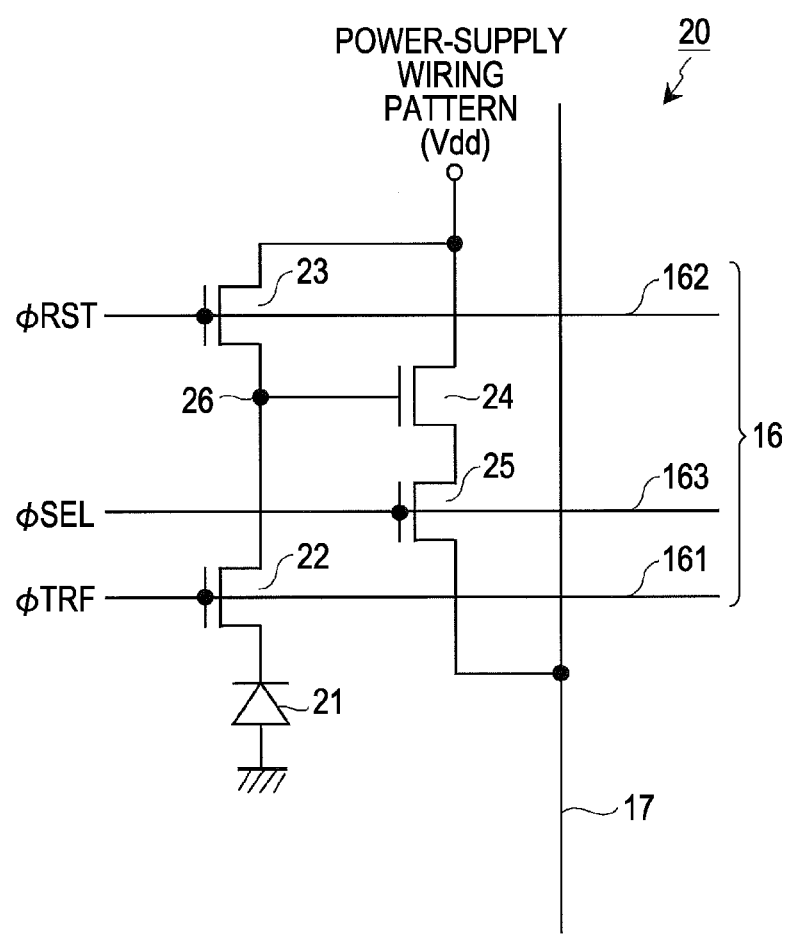
FIG. 2 is a circuit diagram showing an example of a circuit configuration of a unit pixel.

FIG. 2 is a circuit diagram showing an example of a circuit configuration of a unit pixel 20. As shown in FIG. 2, the unit pixel 20 in this example of the circuit configuration includes a photoelectric conversion element, e.g., a photodiode 21, and four transistors, e.g., a transfer transistor 22, a reset transistor 23, an amplification transistor 24, and a selection transistor 25.

Here, as the four transistors 22 to 25, for example, N-channel MOS transistors are used. However, a combination of conductive transistors that is provided as an example, i.e., a combination of the transfer transistor 22, the reset transistor 23, the amplification transistor 24, and the selection transistor 25, is only one example. The combination is not limited to the above-mentioned combination.

Regarding the unit pixel 20, as one pixel drive line 16, three wiring patterns for driving, e.g., a transfer line 161, a reset line 162, and a selection line 163, are commonly provided for each of the pixels of the same pixel row. Ends of the transfer line 161, the reset line 162, and the selection line 163 are connected to output terminals of the vertical drive section 12 which are provided for the pixel row. Each of groups of the transfer line 161, the reset line 162, and the selection line 163 is provided for a corresponding one of the pixel rows.

Regarding the photodiode 21, an anode electrode thereof is connected to a negative power supply (for example, the ground). The photodiode 21 performs photoelectric conversion to convert received light to photocharge (herein, photoelectron) so that the amount of the photocharge will be determined in accordance with the amount of the received light. A cathode electrode of the photodiode 21 is electrically connected to a gate electrode of the amplification transistor 24 via the transfer transistor 22. A node 26 that is electrically connected to the gate electrode of the amplification transistor 24 is referred to as a floating diffusion (FD) unit.

The transfer transistor 22 is connected between the cathode electrode of the photodiode 21 and the FD unit 26. A transfer pulse φTRF whose high level (for example, Vdd level) is an active level (hereinafter, referred to as "active High") is applied to a gate electrode of the transfer transistor 22 via the transfer line 161. The transfer transistor 22 is turned on by the transfer pulse φTRF, so that the transfer transistor 22 transfers, to the FD unit 26, the photocharge that has been obtained by photoelectric conversion with the photodiode 21.

Regarding the reset transistor 23, drain and source electrodes thereof are connected to a pixel power supply Vdd and the FD unit 26, respectively. A reset pulse φRST that is active High is applied to a gate electrode of the reset transistor 23 via the reset line 162. The reset transistor 23 is turned on by the reset pulse φRST, so that the reset transistor 23 resets the FD unit 26 by draining charge in the FD unit 26 into the pixel power supply Vdd before signal charge is transferred from the photodiode 21 to the FD unit 26.

Regarding the amplification transistor 24, the gate and drain electrodes thereof are connected to the FD unit 26 and the pixel power supply Vdd, respectively. The amplification transistor 24 outputs, as a reset signal (having a reset level) Vreset, a potential of the FD unit 26 after the FD unit 26 is reset by the reset transistor 2. The amplification transistor 24 further outputs, as a light accumulation signal (having a signal level) Vsig, a potential of the FD unit 26 after signal charge is transferred by the transfer transistor 22.

Regarding the selection transistor 25, for example, drain and source electrodes thereof are connected to a source electrode of the amplification transistor 24 and the vertical signal line 17, respectively. A selection pulse φSEL that is active High is applied to a gate electrode of the selection transistor 25 via the selection line 163. The selection transistor 25 is turned on by the selection pulse φSEL, so that the selection transistor 25 causes the unit pixel 20 to enter a selected state and passes, to the vertical signal line 17, a signal which is output from the amplification transistor 24.

Note that, regarding the selection transistor 25, a circuit configuration can also be employed, in which the selection transistor 25 is connected between the pixel power supply Vdd and the drain electrode of the amplification transistor 24.

Furthermore, the unit pixel 20 is not limited to a unit pixel having a pixel configuration in which the four transistors having the above-described configurations are used. For example, the unit pixel 20 may be a unit pixel having a pixel configuration in which three transistors obtained by using one transistor both as the amplification transistor 24 and as the selection transistor 25 are used. Any configuration may be employed for the circuit of the unit pixel.

1-2. Characteristic Portion of Embodiment

As described above, an X-Y address solid-state image pickup device such as the CMOS image sensor 10 having the above-described configuration includes an optical black pixel region, which has pixels that are shielded from light and that are used to output black reference signals, around an effective pixel region, which has pixels for providing signals that are eventually to be used as image signals. Regarding the X-Y address solid-state image pickup device having the optical black pixel region, the following configuration is employed in the present embodiment.

In other words, dummy pixels (a dummy pixel region) having a light-shielding structure that is the same as a light-shielding structure of the effective pixel region are disposed in a boundary portion between the optical black pixel region and the effective pixel region. When a scanning operation is performed, driving is performed so that signals of the dummy pixels will not be output by being skipped without being selected. Driving that is performed so that the signals of the dummy pixels will be skipped can be realized using the vertical scanning operation that is performed by the vertical drive section 12 and using the horizontal scanning operation that is performed by the horizontal drive section 14 because the device is an X-Y address solid-state image pickup device.

As mentioned above, the dummy pixel region having the light-shielding structure that is the same as the light-shielding structure of the effective pixel region is disposed in the boundary portion between the optical black pixel region and the effective pixel region. Driving is performed so that the signals of the individual opening dummy pixels of the dummy pixel region will be skipped. Accordingly, the following functional effects can be obtained. In other words, the dummy pixel region having the light-shielding structure that is the same as the light-shielding structure of the effective pixel region is disposed in the boundary portion between the effective pixel region and the optical black pixel region in which the optical characteristics are influenced by the difference in the film thickness of an upper layer of a light-shielding layer, whereby occurrence of optical non-uniformity can be reduced in a peripheral portion of the effective pixel region.

Here, the reason why a film thickness of the upper layer of the light-shielding layer of a central portion of the effective pixel region is different from a film thickness of the upper layer of the light-shielding layer of the boundary portion between the effective pixel region and the optical black pixel region is as follows. In other words, also as described above, because a layout of the upper layer of the light-shielding layer of a light-shielding portion of the optical black pixel region is different from a layout of the upper layer of the light-shielding layer of an opening portion of the effective pixel region, the difference between the film thickness of the upper layer of the light-shielding layer of the central portion of the effective pixel region and the film thickness of the upper layer of the light-shielding layer of the boundary portion between the effective pixel region and the optical black pixel region occurs. Examples of the upper layer of the light-shielding layer include a passivation film, a color filter, a lens member, and so forth.

Furthermore, the signals of the individual opening dummy pixels of the dummy pixel region that are disposed at the top, bottom, left, and right sides of the effective pixel region are skipped without being selected, thereby outputting only signals which are eventually to be used as image signals and the number of which is equal to the number of elective pixels. Accordingly, it is not necessary that the drive frequency be increased for the frame rate. Additionally, the dummy pixels are disposed in the boundary portion between the optical black pixel region and the effective pixel region, whereby variation in dark current or random noise due to variation in interface state, which is caused by the difference between a shape of a light-shielding metal of the opening portion of the effective pixel region and a shape of the light-shielding metal of the optical black pixel region, can be reduced.

Hereinafter, specific embodiments for performing driving so that the signals of the individual opening dummy pixels of the dummy pixel region will be skipped without being selected when a scanning operation is performed will be described.

1-3. First Embodiment

Figure 3:
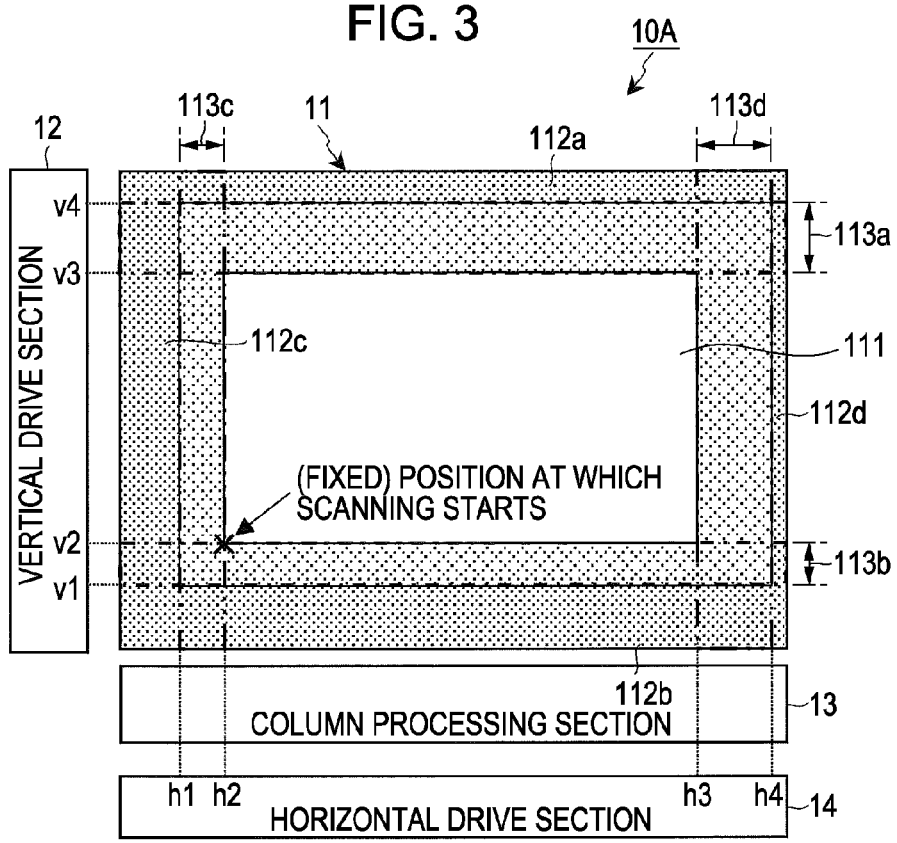
FIG. 3 is a plan view schematically showing a configuration of a CMOS image sensor according to a first embodiment.

FIG. 3 is a plan view schematically showing a configuration of a CMOS image sensor according to a first embodiment. In FIG. 3, the same reference numerals are used for the same elements as those in FIG. 1.

In a CMOS image sensor 10A according to the first embodiment, the pixel array section 11 includes an effective pixel region 111, which has pixels for providing signals that are eventually to be used as image signals, and an optical black pixel region 112, which is provided around a peripheral portion of the effective pixel region 111 and which has pixels that are used to output black reference signals. The size of the effective pixel region 111 is determined as a fixed size in accordance with the number of pixels in the horizontal directions and the number of pixels in the vertical directions in advance.

The optical black pixel region 112 includes, for example, optical black pixel regions 112a and 112b, which are provided at the top and bottom sides of the effective pixel region 111, and optical black pixel regions 112c and 112d, which are provided at the left and right sides of the effective pixel region 111. All faces of the optical black pixel regions 112a to 112d are shielded from light by light-shielding metal. Regarding the optical black pixel region 112, a configuration is not necessarily employed, in which the optical black pixel regions included in the optical black pixel region 112 are provided at all of the top, bottom, left, and right sides of the effective pixel region 111.

The pixel array section 11 includes, in addition to the effective pixel region 111 and the optical black pixel region 112, a dummy pixel region 113 between the effective pixel region 111 and the optical black pixel region 112. The dummy pixel region 113 includes dummy pixel regions 113a to 113d, and the top, bottom, left, and right dummy pixel regions 113a to 113d are provided for the top, bottom, left, and right optical black pixel regions 112a to 112d, respectively. When the optical black pixel regions included in the optical black pixel region 112 are not provided at all of the top, bottom, left, and right sides of the pixel array section 111, it is not necessary that the dummy pixel regions included in the dummy pixel region 113 be provided at all of the top, bottom, left, and right sides. Basically, each of dummy pixels of the dummy pixel region 113 (113a to 113d) has an opening pixel structure (i.e., non-light-shielding structure) that is the same as a pixel structure of each of the pixels of the effective pixel region 111.

As described above, the dummy pixel region 113 is provided in the boundary portion between the effective pixel region 111 and the optical black pixel region 112 in which the optical characteristics are influenced by the difference in the film thickness of an upper layer of a light-shielding layer, whereby occurrence of optical non-uniformity can be reduced in a peripheral portion of the effective pixel region 111. As described above, the dummy pixel region 113 has a light-shielding structure that is the same as a light-shielding structure of the effective pixel region 111.

Figure 4:
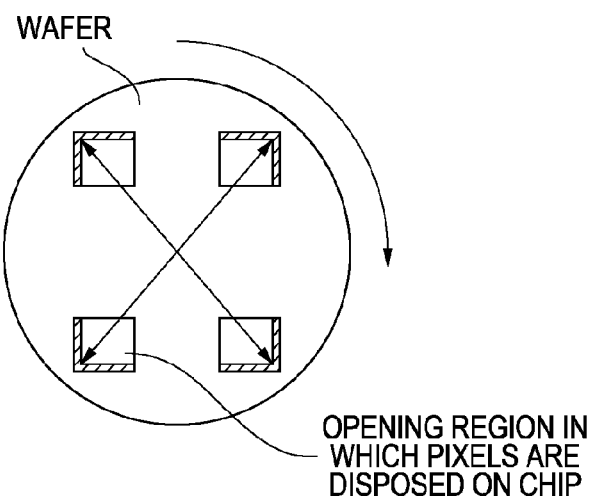
FIG. 4 is an illustration for explaining occurrence of optical non-uniformity when spin coating is performed.

Here, one of reasons why optical non-uniformity occurs in the boundary portion between the effective pixel region 111 and the optical black pixel region 112 is that a film which is applied using spin coating is used. In this case, because the applied film is formed to be radial on a wafer, when a step portion is designed so that the upper part of the step portion is located at the periphery of a chip, the film thickness tends to significantly increase at sides of the effective pixel regions on chips that are located at the periphery of the wafer. Accordingly, optical non-uniformity easily occurs at sides of the effective pixel regions on chips that are in contact with the periphery of the wafer as shown in FIG. 4.

In this case, in order to reduce occurrence of optical non-uniformity in the step portion by using the opening dummy pixels of the dummy pixel region 113, it is necessary that the substantial same number of optical dummy pixels be disposed at each of the sides. Furthermore, a region in which optical non-uniformity easily occurs can be predicted to some extent. With the prediction, the effective pixel region 111 having a predetermined size is set, on the pixel array section 11, in a region excluding the region in which optical non-uniformity easily occurs. Then, the dummy pixel region 113 (113*a* to 113*d*) having a predetermined number of pixels (a predetermined size) is set around the effective pixel region 111.

In an example shown in FIG. 3, the pixel at the lower-left corner of the effective pixel region 111 is set as a scanning start pixel (a scanning start position). An address information item concerning the scanning stat pixel is stored in advance in a storage unit that is provided in the system control section 15 shown in FIG. 1, e.g., a memory. Furthermore, in order to skip the signals of the individual opening pixels of the dummy pixel regions 113*a* to 113*d* without selecting them, address information items concerning start pixels and end pixels of the dummy pixel regions 113*a* to 113*d* are also stored in advance in the memory that is provided in the system control section 15.

Regarding the address information items that are stored in advance in the memory provided in the system control section 15, once the address information items are set, they become invariable as fixed information items. In other words, the scanning start position (a position indicated by a symbol "X" in FIG. 3) of the effective pixel region 111 and the position and size of the dummy pixel region 113 (113*a* to 113*d*) on the pixel array section 11 become invariable and fixed.

Note that, because the address information items are fixed, in a case in which the vertical drive section 12 and the horizontal drive section 14 are configured using address decoders, timing patterns for the address decoders can be generated so that the dummy pixels will be skipped when the timing patterns are run. Accordingly, the memory in which the address information items are stored becomes unnecessary.

In order not to use the signals of the individual opening dummy pixels of the dummy pixel regions 113*a* to 113*d* as image signals, driving so that the signals of the opening dummy pixels will be skipped without being selected is performed by the vertical drive section 12 and the horizontal drive section 14. The vertical drive section 12 performs driving so that the signals of the individual opening dummy pixels of the dummy pixel regions 113*a* and 113*b* which are disposed at the top and bottom sides of the effective pixel region 111 (at the sides in the vertical directions) will be skipped. Furthermore, the horizontal drive section 14 performs driving so that the signals of the individual opening dummy pixels of the dummy pixel regions 113*c* and 113*d* which are disposed at the left and right sides of the effective pixel region 111 (at the sides in the horizontal directions) will be skipped.

In FIG. 3, a start pixel (start row) address and an end pixel address of the dummy pixel region 113*b* that is provided at the bottom side are denoted by v1 and v2, respectively. A start pixel address and an end pixel address of the dummy pixel region 113*a* that is provided at the top side are denoted by v3 and v4, respectively. Address information items concerning these addresses v1 to v4 are stored in advance in the memory that is provided in the system control section 15. The system control section 15 performs control of skipping the signals with the vertical drive section 12 using the address information items concerning the addresses v1 to v4.

More specifically, the system control section 15 performs control so that the transfer pulse φTRF, the reset pulse φRST, and the selection pulse φSEL will not be output from the vertical drive section 12 for the pixel rows belonging to the dummy pixel regions 113*a* and 113*b* that are provided at the top and bottom sides of the effective pixel region 111. With this control, it is possible that the signals of the individual opening dummy pixels of the dummy pixel regions 113*a* and 113*b* are skipped without being output.

Furthermore, in FIG. 3, a start pixel (start column) address and an end pixel address of the dummy pixel region 113*c* that is provided at the left side are denoted by h1 and h2, respectively. A start pixel address and an end pixel address of the dummy pixel region 113*d* that is provided at the right side are denoted by h3 and h4, respectively. Address information items concerning these addresses h1 to h4 are stored in advance in the memory that is provided in the system control section 15. The system control section 15 performs control of skipping the signals with the horizontal drive section 14 using the address information items concerning the addresses h1 to h4.

The control of skipping the signals with the horizontal drive section 14 is performed in the following manner. In other words, the signals are read from the pixel array section 11 on a row-by-row basis. When the pixel signals of one row that are temporarily held in the column processing section 13 are selected by the horizontal drive section 14, the horizontal scanning operation is performed so that the signals of the individual opening dummy pixels of the dummy pixel regions 113*c* and 113*d* that are provided at the left and right sides will be skipped.

Figure 5:
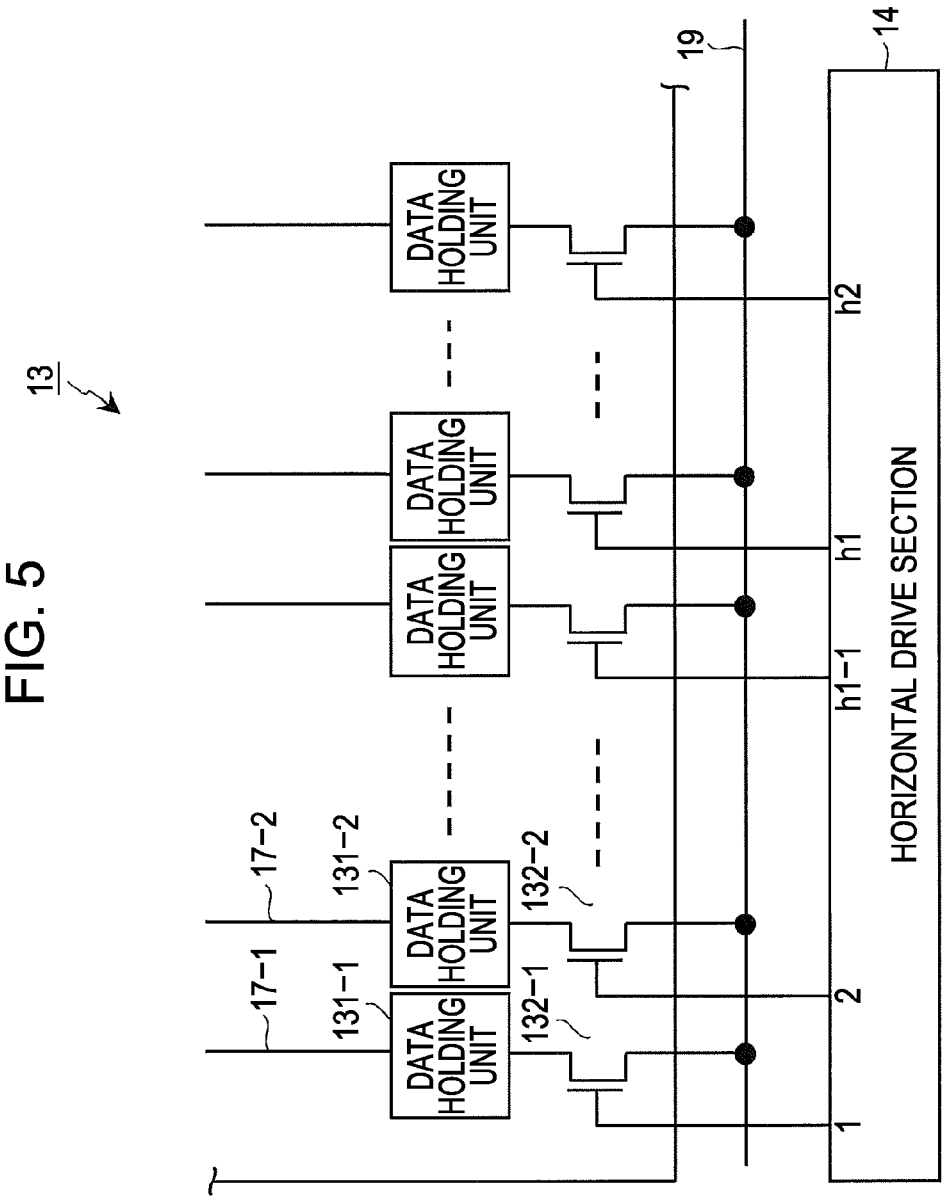
FIG. 5 is a circuit diagram showing an example of a circuit configuration of an output portion of a column processing section.

FIG. 5 shows an example of a circuit configuration of an output portion of the column processing section 13. In the output portion of the column processing section 13, data holding units 131-1, 131-2, . . . , and so forth, each of which is provided for a corresponding one of the pixel columns, and horizontal selection switches 132-1, 132-2, . . . , and so forth, each of which is provided between an output terminal of a corresponding one of the data holding units 131-1, 131-2, . . . , and so forth and a signal output line 19. The pixel signals of one row that are read from the pixel array section 11 are temporarily held in the data holding units 131-1, 131-2, . . . , and so forth.

The horizontal selection switches 132-1, 132-2, . . . , and so forth are sequentially turned on in response to horizontal scanning pulse 4H1, 4H2, . . . , and so forth that are sequentially output from the horizontal drive section 14, thereby outputting the pixel signals that are held in the data holding units 131-1, 131-2, . . . , and so forth to the signal output line 19. When the horizontal scanning operation is performed, the system control section 15 performs control so that the horizontal scanning pulses φH will not be output from the horizontal drive section 14 for the pixel columns belonging to the dummy pixel regions 113c and 113d that are provided at the left and right sides. With this control, it is possible that the signals of the individual opening dummy pixels of the dummy pixel regions 113c and 113d are skipped without being output.

Here, the data holding units 131-1, 131-2, . . . , and so forth are provided in the output portion of the column processing section 13, and the pixel signals of one row are temporarily held in the data holding units 131-1, 131-2, . . . , and so forth. However, this is only one example.

When the column processing section 13 has circuit portions that can temporarily hold pixel signals, such as CDS circuits or A/D converters, the circuit portions can be also used as the holding units 131-1, 131-2, . . . , and so forth.

Figure 6:
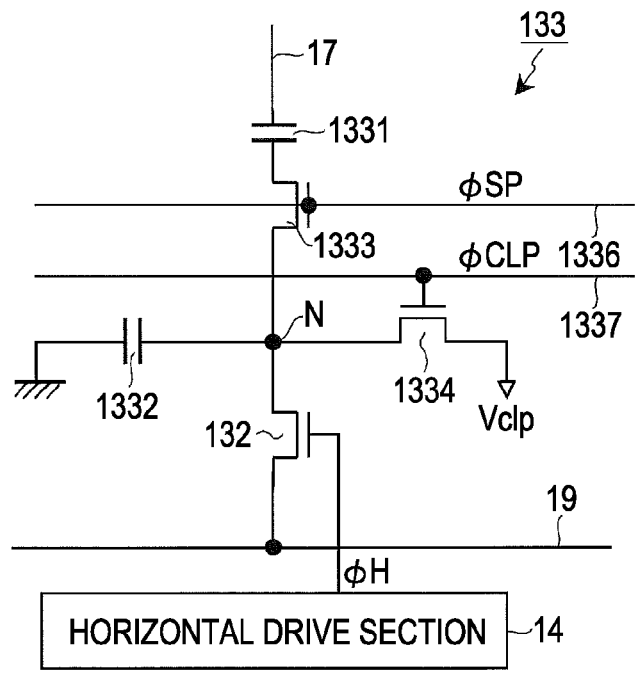
FIG. 6 is a circuit diagram showing an example of a circuit configuration of a correlated double sampling (CDS) circuit.

FIG. 6 shows one example of a circuit configuration of a CDS circuit. In FIG. 6, the same reference numerals are used for the same elements as those in FIG. 5. A CDS circuit 133 in this example includes two capacitors 1331 and 1332, a sampling transistor 1333, and a clamp transistor 1334, and one CDS circuit 133 is disposed for each of the vertical signal lines 17.

Regarding the capacitor 1331, one of ends thereof is connected to the vertical signal line 17. Regarding the sampling transistor 1333, a drain electrode thereof is connected to the other end of the capacitor 1331, and a sampling pulse φSP is applied to a gate electrode of the sampling transistor 1333 via a control line 1336. Regarding the capacitor 1332, one of ends thereof is connected to a source electrode of the sampling transistor 1333, and the other end is connected to the ground.

Regarding the clamp transistor 1334, a source electrode thereof is connected to the source electrode of the sampling transistor 1333. A clamp voltage Vclp is applied to a drain electrode of the clamp transistor 1334, and a clamp pulse φCLP is applied to a gate electrode of the clamp transistor 1334 via a control line 1337. Here, a node at which the source electrode of the sampling transistor 1333, one end of the capacitor 1332, and the source electrode of the clamp transistor 1334 are commonly connected is referred to as a node N.

The above-mentioned horizontal selection switch 132 is disposed at the output side of the CDS circuit 133. In other words, regarding the horizontal selection switch 132, a drain electrode thereof is connected to an output terminal of the CDS circuit 133, i.e., the node N, and a source electrode thereof is connected to the signal output line 19. A corresponding one of the horizontal selection pulses φH (φH1, φH2, . . . , and so forth) that are sequentially output from the horizontal drive section 14 in synchronization with the horizontal scanning operation is applied to a gate electrode of the horizontal selection switch 132.

In the CDS circuit 133 having the above-described configuration, a pixel signal can be temporarily held in the capacitor 1332. Accordingly, the CDS circuit 133 can be also used as each of the data holding units 131-1, 131-2, . . . , and so forth. Thus, because it is not necessary that the data holding units 131-1, 131-2, . . . , and so forth are provided only for holding data, the circuit scale of the CDS circuit 133 can be reduced, and, further, the circuit scale of the column processing section 13 can be reduced, compared with a case in which the data holding units 131-1, 131-2, . . . , and so forth are provided.

Furthermore, in order to skip the pixel signals that are output from the dummy pixel regions 113c and the 113d which are provided at the left and right sides, a pixel signal is not to be read using a CDS circuit 133i corresponding to a pixel column i belonging to the dummy pixel regions 113c and the 113d. Accordingly, a configuration can be employed, in which the circuit operation of the CDS circuit 133i halts. Thus, the power consumption of the column processing section 13 can be reduced, and, further, the power consumption of the CMOS image sensor 10A can be reduced, compared with a case in which the circuit operation of the CDS circuit 133i corresponding to the pixel column i belonging to the dummy pixel regions 113c and the 113d does not halt.

As described above, the dummy pixel regions 113a to 113d are disposed in the boundary portion between the optical black pixel regions 112a to 112d and the effective pixel region 111, and driving is performed so that the signals of the opening dummy pixels will be skipped, whereby the following functional effects can be obtained. In other words, the dummy pixel regions 113a to 113d are disposed in the boundary portion between the effective pixel region 111 and the optical black pixel regions 112a to 112d in which the optical characteristics are influenced by difference in the film thickness of the upper layer of the light-shielding layer, whereby occurrence of optical non-uniformity can be reduced in the peripheral portion of the effective pixel region 111.

Furthermore, because the signals of the individual opening dummy pixels of the dummy pixel regions 113a to 113d that are provided at the top, bottom, left, and right sides are skipped without being selected, it is not necessary that the drive frequency be increased for the frame rate. In other words, the signals of the opening dummy pixels are not output from the CMOS image sensor 10A, and signals that are eventually output are only the signals which are to be used as image signals and the number of which is equal to the number of elective pixels. Accordingly, it is not necessary that the drive frequency be increased for the frame rate.

Moreover, the dummy pixel regions 113a to 113d are provided, whereby variation in dark current or random noise due to variation in interface state, which is caused by the difference between a shape of a light-shielding metal of the opening portion of the effective pixel region 111 and a shape of the light-shielding metal of the optical black pixel regions 112a to 112d, can be reduced. The reason for this is that the dummy pixel regions 113a to 113d, which are provided in the boundary portion between the optical black pixel regions 112a to 112d and the effective pixel region 111, have the light-shielding structure that is the same as the light-shielding structure of the effective pixel region 111.

A case is described above, in which the signals of the individual effective pixels of the effective pixel region 111 are read, and in which the signals of the individual opening dummy pixels of the dummy pixel regions 113a to 113d are read. However, the signals of the individual pixels, which are shielded from light, of the optical black pixel regions 112a to 112d are also read as in the case of the signals of the effective pixels. The signals of the individual pixels, which are shielded from light, of the optical black pixel regions 112a to 112d are used as black reference signals for image signals.

Prevention Against Blooming

When light having a high intensity enters the individual opening dummy pixels of the dummy pixel region 113 (113a to 113d), charge overflows from the dummy pixels. Excess charge that overflows from the opening dummy pixels flows into pixels adjacent to the opening dummy pixels, whereby blooming occurs. The blooming negatively influences the effective pixels of the effective pixel region 111.

Here, in the CMOS image sensor 10A according to the first embodiment, the positions of the dummy pixel regions 113a to 113d are fixed as predetermined positions. When the positions of the dummy pixel regions 113a to 113d are fixed as described above, an influence of blooming on the effective pixels that is caused by charge or incident light leaking from the opening dummy pixels can be reduced by designing the pixel structure of the unit pixel 20.

Figure 7:
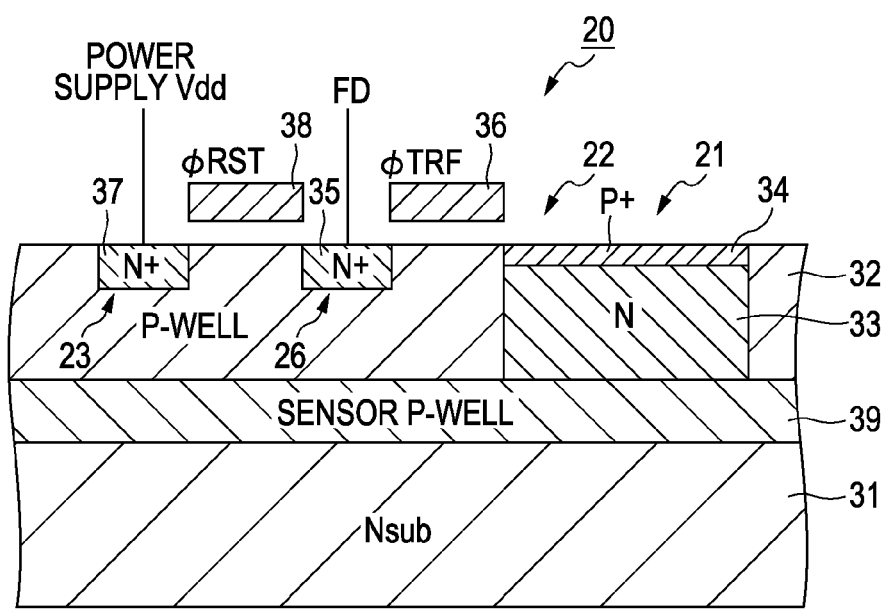
FIG. 7 is a cross sectional view showing an example of a cross-sectional structure of the unit pixel.

FIG. 7 is a cross sectional view showing an example of a cross-sectional structure of the unit pixel 20. In FIG. 7, the same reference numerals are used for the same elements as those in FIG. 2.

Referring to FIG. 7, the photodiode 21 is formed using a PN junction between a P-well 32 on an N-type semiconductor substrate 31 and an N-type layer 33 that is formed in the P-well 32. The photodiode 21 includes a P-type layer that is provided at the substrate surface side of the N-type layer 33, i.e., a hole accumulation layer 34. Note that a sensor P-well 39 having an impurity concentration which is lower than that of the P-well 32 is formed under the photodiode 21.

The transfer transistor 22 has an N-type layer 35, which serves as the FD unit 26, as the drain region, and has a configuration in which a gate electrode 36 is formed above a channel between the N-type layer 33 of the photodiode 21 and the N-type layer 35 so that an insulator film (not illustrated) is provided between the channel and the gate electrode 36. The reset transistor 23 has an N-type layer 37 as the drain region, and has a configuration in which a gate electrode 38 is formed above a channel between the N-type layer 35, which serves as the FD unit 26, and the N-type layer 37 so that an insulator film (not illustrated) is provided between the channel and the gate electrode 38.

In the pixel structure of the unit pixel 20 having the above-mentioned configuration, the following techniques are employed for prevention against blooming, whereby the influence of blooming on the effective pixels that is caused by charge or incident light leaking from the individual opening dummy pixels of the dummy pixel regions 113a to 113d can be reduced.

As a first technique, the gate length of the transfer transistor 22 is changed. More specifically, the width of a wiring pattern of the gate electrode 36 (the width of the gate electrode 36 in the left and right directions in FIG. 7) is reduced so that the width of the wiring pattern is narrower than a width of the wiring pattern before prevention against blooming is provided, thereby reducing a transfer gate length. Since the transfer gate length is reduced, the position of the N-type layer 35, which serves as the FD unit 26, is moved closer to the photodiode 21. Accordingly, a so-called horizontal-type overflow path from the photodiode 21 to the FD unit 26 is formed. Thus, charge that overflows from each of the opening dummy pixels of the dummy pixel regions 113a and 113b flows into the FD unit 26 via the horizontal-type overflow path. Therefore, the influence of blooming on the effective pixels that is caused by charge or incident light leaking from the opening dummy pixels can be reduced.

As a second technique, an impurity profile (a potential profile) of impurities that are provided under the photodiode 21 is changed. More specifically, the impurity concentration of the sensor P-well 39 that is formed under the photodiode 21 is set to be lower than an impurity concentration before the impurity profile is changed. Alternatively, the sensor P-well 39 is omitted. A so-called vertical-type overflow path from the photodiode 21 to the N-type semiconductor substrate 31 is formed by changing the impurity profile of impurities that are provided under the photodiode 21. Accordingly, charge that overflows from each of the opening dummy pixels of the dummy pixel regions 113a and 113b flows into the semiconductor substrate 31 via the vertical-type overflow path. Thus, the influence of blooming on the effective pixels that is caused by charge or incident light leaking from the opening dummy pixels can be reduced.

The above-described first and second techniques for designing the pixel structure of the unit pixel 20 can be employed because the positions of the dummy pixel regions 113a to 113d that are provided at the top, bottom, left, and right sides of the effective pixel region 111 are determined as fixed positions.

1-4. Second Embodiment

Figure 8:
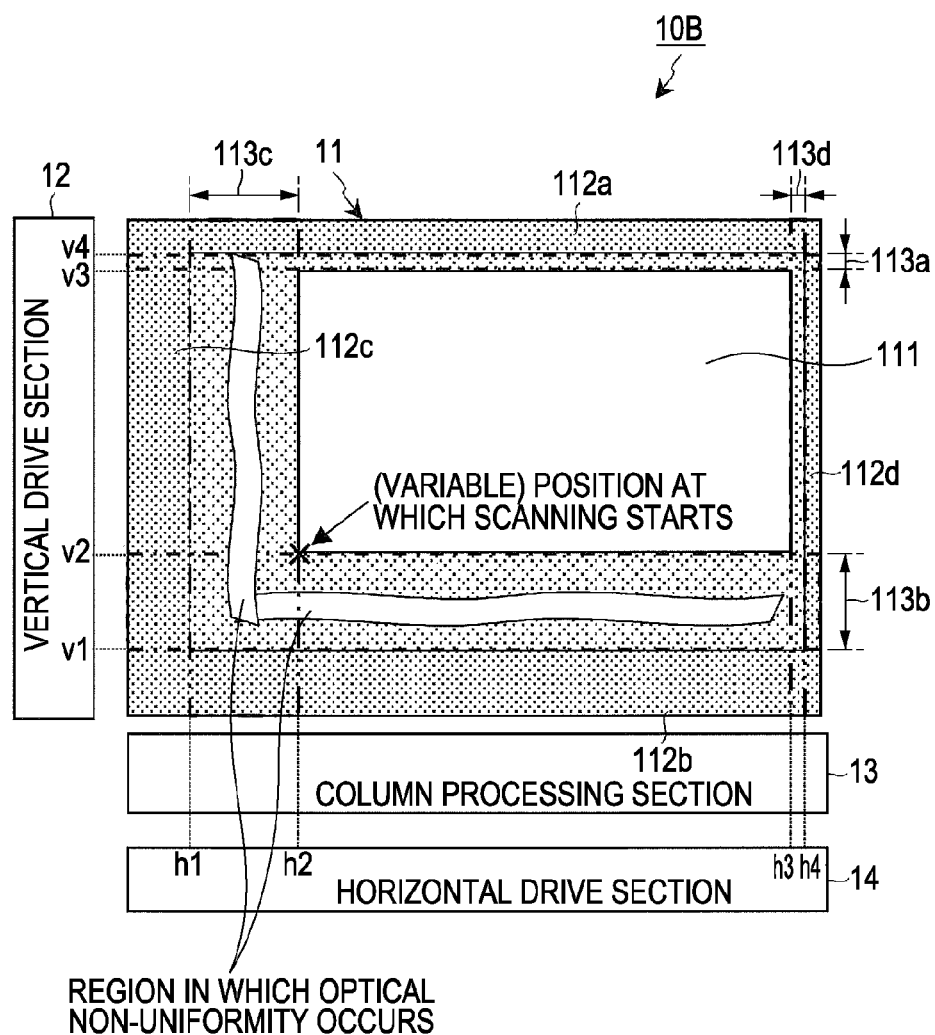
FIG. 8 is a plan view schematically showing a configuration of a CMOS image sensor according to a second embodiment.

FIG. 8 is a plan view schematically showing a configuration of a CMOS image sensor according to a second embodiment. In FIG. 8, the same reference numerals are used for the same elements as those in FIG. 3.

The CMOS image sensor 10A according to the first embodiment has a configuration in which the position of the effective pixel region 111 and the positions of the dummy pixel regions 113a to 113d that are provided at the top, bottom, left, and right sides of the effective pixel region 111 are determined as fixed positions. Here, determination of the positions as fixed positions means that the positions are invariable after the positions are determined. Accordingly, the address information item concerning the scanning start position (the position of the pixel disposed at the lower-left corner) is also fixed.

On the other hand, the CMOS image sensor 10B according to the second embodiment has a configuration in which the position of the effective pixel region 111 and the positions of the dummy pixel regions 113a to 113d that are provided at the top, bottom, left, and right sides of the effective pixel region 111 can be arbitrarily set. Since the position of the effective pixel region 111 and the positions of the dummy pixel regions 113a to 113d can be arbitrarily set, an address information item concerning a scanning start position (a position indicated by a symbol "x" in FIG. 8) of the effective pixel region 111 can be variable. However, the size of the effective pixel region 111 that is determined in accordance with the number of pixels in the horizontal directions and the number of pixels in the vertical directions is fixed as in the case of the first embodiment.

In order to reduce occurrence of optical non-uniformity in the peripheral portion of the effective pixel region 111, the positions and sizes of the dummy pixel regions 113a to 113d are set in the following manner. Here, the positions of the dummy pixel regions 113a to 113d are absolute positions on the pixel array section 11. Furthermore, the sizes of the dummy pixel regions 113a to 113d are determined in accordance with the number of pixels in the horizontal directions and the number of pixels in the vertical directions.

The dummy pixel regions 113a to 113d have the light-shielding structure that is the same as the light-shielding structure of the effective pixel region 111. Basically, each of the pixels of the dummy pixel regions 113a to 113d has the structure that is the same as the structure of each of the opening pixels of the effective pixel region 111. Accordingly, the pixel array section 11 can be easily produced. However, it is necessary that the dummy pixels be designed so that continuity is not lost between the dummy pixels and the pixels of the effective pixel region 111. In other words, concepts of the structure which is the same as that of each of the pixels of the effective pixel region 111 also include a pixel structure in which, when an exit pupil distance is short, the position of an on-chip lens or the like is shifted (pupil correction is performed), thereby improving the shading characteristics.

Regarding the sizes of the dummy pixel regions 113a to 113d (the number of opening dummy pixels of the dummy pixel regions 113a to 113d), measurement of the sizes is performed in an inspection step of the CMOS image sensor 10B to determine whether or not the sizes satisfy specifications, and the sizes are determined on the basis of a measurement result. Measurement of the sizes to determine whether or not the sizes satisfy the specifications is performed, for example, by checking whether or not the levels of signals of the individual pixels fall within a range of defined levels when the pixels are irradiated with light having a fixed intensity. With this measurement, from among all of regions excluding the optical black pixel regions 112a to 112d, a pixel region in which the levels of signals fall within the range of defined levels is set as the effective pixel region 111 having a predetermined size.

Then, the remaining regions between the effective pixel region 111 and the optical black pixel regions 112a to 112d are set as the dummy pixel regions 113a to 113d. Accordingly, for example, in a case in which it is supposed that the individual sizes of the optical black pixel regions 112a to 112d are the same, when the center of the effective pixel region 111 coincides with the center of the pixel array section 11, the individual sizes of the dummy pixel regions 113a to 113d become the same. In contrast, when the position of the effective pixel region 111 is set so that the center of the effective pixel region 111 is shifted from the center of the pixel array section 11, the individual sizes of the dummy pixel regions 113a to 113d become different from one another in accordance with the position of the effective pixel region 111.

In this manner, first, the scanning start position of the effective pixel region 111 is determined by determining the position of the effective pixel region 111 on the pixel array section 11. Then, the address information item concerning the scanning start position is stored in the storage unit that is provided in the system control section 15 shown in FIG. 1, e.g., a register, for example, using communication from an external device. In other words, the address information item concerning the scanning start position that is stored in the register which is provided in the system control section 15 can be arbitrarily set and changed using communication from an external device.

Furthermore, the positions and sizes of the dummy pixel regions 113a to 113d are determined by determining the position of the effective pixel region 111 on the pixel array section 11. Then, in order to skip the signals of the individual opening pixels of the dummy pixel regions 113a to 113d without selecting them, address information items concerning start pixels and end pixels of the dummy pixel regions 113a to 113d are also stored in the register that is provided in the system control section 15, for example, using communication from an external device. In other words, the address information items concerning the dummy pixel regions 113a to 113d that are stored in the register which is provided in the system control section 15 can also be arbitrarily set and changed using communication from an external device.

In order not to use the signals of the individual opening dummy pixels of the dummy pixel regions 113a to 113d as image signals, driving so that the signals of the opening dummy pixels will be skipped without being selected can be performed by the vertical drive section 12 and the horizontal drive section 14 as in the case of the first embodiment. The vertical drive section 12 performs driving so that the signals of the individual opening dummy pixels of the dummy pixel regions 113a and 113b which are disposed at the top and bottom sides of the effective pixel region 111 will be skipped. The horizontal drive section 14 performs driving so that the signals of the individual opening dummy pixels of the dummy pixel regions 113c and 113d which are disposed at the left and right sides of the effective pixel region 111 will be skipped.

In FIG. 8, the start pixel (start row) address and the end pixel address of the dummy pixel region 113b that is provided at the bottom side are denoted by v1 and v2, respectively. The start pixel address and the end pixel address of the dummy pixel region 113a that is provided at the top side are denoted by v3 and v4, respectively. Address information items concerning these addresses v1 to v4 are stored in advance in the memory that is provided in the system control section 15. The system control section 15 performs control of skipping the signals with the vertical drive section 12 using the address information items concerning the addresses v1 to v4. The details of the control of skipping the signals are the same as those described in the first embodiment.

Furthermore, in FIG. 8, the start pixel (start column) address and the end pixel address of the dummy pixel region 113c that is provided at the left side are denoted by h1 and h2, respectively. The start pixel address and the end pixel address of the dummy pixel region 113d that is provided at the right side are denoted by h3 and h4, respectively. Address information items concerning these addresses h1 to h4 are stored in advance in the memory that is provided in the system control section 15. The system control section 15 performs control of skipping the signals with the horizontal drive section 14 using the address information items concerning the addresses h1 to h4. The details of the control of skipping the signals are the same as those described in the first embodiment.

As described above, the dummy pixel regions 113a to 113d are disposed in the boundary portion between the optical black pixel regions 112a to 112d and the effective pixel region 111, and driving is performed so that the signals of the opening dummy pixels will be skipped, whereby functional effects that are similar to those of the first embodiment can be obtained. In other words, occurrence of optical non-uniformity can be reduced in the peripheral portion of the effective pixel region 111 without increasing of the drive frequency for the frame rate. In addition, variation in dark current or random noise due to variation in interface state can be reduced.

In the second embodiment, in addition to the functional effects of the first embodiment, the following functional effects can be obtained. In other words, since the position of the effective pixel region 111 can be arbitrarily set on the pixel array section 11, the position of the effective pixel region 111 can be set so that pixels which do not function as pixels and which have other certain defects will not be included in the effective pixel region 111. Thus, not only reduction of optical non-uniformity but also improvement of the yield of the CMOS image sensor can be realized.

In a case in which the position of the effective pixel region 111 is determined as a fixed position on the pixel array section 11 as in the case of the first embodiment, when pixels having certain defects exist in the effective pixel region 111, it is necessary that the CMOS image sensor be discarded. Accordingly, the yield of the CMOS image sensor is reduced.

Furthermore, since the address information item concerning the scanning start position that is stored in the register which is provided in the system control section 15 mounted in the CMOS image sensor 10B can be arbitrary set and changed using communication from an external device, the following functional effect can be obtained. In other words, when bonding of a die to a package is performed or when determination of the position of an on-chip lens is performed, the optical position can be easily adjusted.

Prevention Against Blooming

In the second embodiment, a configuration is employed, in which the position of the effective pixel region 111 can be arbitrarily set on the pixel array section 11. Accordingly, it is difficult to provide prevention against blooming using design of the pixel structure of the unit pixel 20 as in the case of the first embodiment. For this reason, in the second embodiment, the following technique is employed for prevention against blooming.

Regarding the opening dummy pixels of the dummy pixel regions 113c and 113d that are disposed at the left and right sides of the effective pixel region 111, the transfer pulse φTRF, the reset pulse φRST, and the selection pulse φSEL are applied to the opening dummy pixels as in the case of application of the pulses to the effective pixels. Accordingly, the opening pixels are designed so that the electronic shutter operation will be performed on the opening pixels as in the case of the effective pixels. Since, with the electronic shutter operation, charge can be prevented from overflowing from the opening dummy pixels of the dummy pixel regions 113c and 113d, the influence of blooming on the effective pixels that is caused by charge or incident light leaking from the opening dummy pixels can be reduced.

In contrast, regarding the opening dummy pixels of the dummy pixel regions 113a and 113b that are disposed at the top and bottom sides of the effective pixel region 111, a voltage value that is higher than a voltage value in a case in which each of the pixel rows of the effective pixel region 111 is in an accumulation state (an exposure state) is applied to each of the opening dummy pixels as the transfer pulse φTRF. In other words, a gate voltage of the transfer gate (the transfer transistor 22) between the photodiode 21 and the FD unit 26 is set to be higher than a gate voltage in a case in which each of the effective pixels is in the accumulation state.

Accordingly, referring to FIG. 2, a potential below the gate of the transfer transistor 22 is reduced to be lower than a potential in a case in which each of the pixel rows of the effective pixel region 111 is in the accumulation state, thereby forming an overflow path from the photodiode 21 to the FD unit 26. As a result, change that overflows from each of the opening dummy pixels of the dummy pixel regions 113a and 113b flows into the FD unit 26 via the overflow path. Thus, the influence of blooming on the effective pixels that is caused by charge or incident light leaking from the opening dummy pixels can be reduced.

Note that the technique for prevention against blooming can be applied to the CMOS image sensor 10A according to the first embodiment having a configuration in which the position of the effective pixel region 111 is fixed on the pixel array section 11.

Additionally, in the above-described first and second embodiments, the pixels of the effective pixel region 111 are not necessarily limited to the pixels in the effective pixel region 111. As one example, in a CMOS image sensor that has a color filter and that supports for a color display, when a coloring process such as edge enhancement or contour correction is performed, there is a case in which signals of the dummy pixels that are located close to the effective pixels which are disposed at an edge portion of the effective pixel region 111, that are disposed in the dummy pixel region 113, and that have a color which is the same as a color of the effective pixels of the effective pixel region 111 are used. In such a case, the dummy pixels that are disposed in the dummy pixel region 113 and that have a color which is the same as a color of the effective pixels of the effective pixel region 111 are also included in the pixels of the effective pixel region 111.

2. Modification Examples

In the above-described embodiments, examples are described, in which the present invention is applied to the CMOS image sensors in which unit pixels that detect charge so that the physical amounts of the charge will be determined in accordance with the amounts of visible light are disposed in a matrix form. However, the present invention is not limited to application to the CMOS image sensors. Furthermore, the present invention is not limited to the solid-state image pickup devices in which a scanning operation is performed on the individual pixels that are disposed in the pixel array section to sequentially select the pixels in units of rows, and in which signals are read from the individual pixels of a selected row. The present invention can be applied to an X-Y address solid-state image pickup device in which pixels are arbitrarily selected in units of pixels and in which signals are read from the selected pixels in units of pixels.

Note that, regarding the form of any of the above-mentioned solid-state image pickup devices, the solid-state image pickup device may be provided as a single chip or a module with an image pickup function in which an image pickup unit and a signal processing unit or an optical system are integrally packaged.

Moreover, the present invention is not limited to application to the solid-state image pickup devices. The present invention can be applied to image pickup apparatuses. Here, the image pickup apparatuses may be camera systems such as digital still cameras or video cameras, or electronic apparatuses having an image pickup function such as mobile phones. Note that the above-mentioned module that is mounted in an electronic apparatus, i.e., a camera module, may be considered as an image pickup apparatus.

3. Application Examples

Image Pickup Apparatus

FIG. 9 is a block diagram showing an example of a configuration of an image pickup apparatus according to an embodiment of the present invention. As shown in FIG. 9, an image pickup apparatus 100 according to the embodiment of the preset invention includes an optical system, which has a group of lenses 101 and so forth, an image pickup element 102, a digital signal processing (DSP) circuit 103, which is a camera signal processing circuit, a frame memory 104, a display device 105, a recording device 106, an operation system 107, a power supply system 108, and so forth. The image pickup apparatus 100 has a configuration in which the DSP circuit 103, the frame memory 104, the display device 105, the recording device 106, the operation system 107, and the power supply system 108 are connected to one another via a bus line 109.

The group of lenses 101 receives incident light (image light) from an object, and forms an image on an image pickup face of the image pickup element 102. The image pickup element 102 converts the amounts of the incident light, with which the image is formed on the image pickup face by the group of lenses 101, to electric signals in units of pixels, and outputs the electric signals as pixels signals. As the image pickup element 102, any one of the CMOS image sensors according to the above-described first to third embodiments, which have the column processing section, is used.

The display device 105 is configured using a panel display device, such as a liquid-crystal display device or an organic electro luminescence (EL) display device, and displays a moving image or a still image that is picked up by the image pickup element 102. The recording device 106 records the moving image or the still image, which is picked up by the image pickup element 102, onto a recording medium such as a video tape or a digital versatile disk (DVD).

The operation system 107 issues, in accordance with user operations, operation instructions for various functions that the image pickup apparatus 100 has. The power supply system 108 appropriately supplies, to the DSP circuit 103, the frame memory 104, the display device 105, the recording device 106, and the operation system 107, various powers with which these devices that are supply targets can operate.

The present application contains subject matter related to that disclosed in Japanese Priority Patent Application JP 2008-303433 filed in the Japan Patent Office on Nov. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup device comprising:
   a semiconductor substrate having a top surface, a doped region of the semiconductor substrate being of a first conductivity type;
   a first well region of a second conductivity type touching said top surface and a second well region of the second conductivity type, said second well region touching said first well region and said doped region;
   an accumulation layer of the second conductivity type touching said top surface and a first layer of the first conductivity type, said first layer touching said accumulation layer and said second well region,
   wherein an impurity concentration of the second conductivity type in said second well region is lower than an impurity concentration of the second conductivity type in said first well region, said first well region touching said accumulation layer and said first layer;
   a floating diffusion unit of the first conductivity type extending from said to surface into said first well region;
   wherein a transfer channel is a portion of the first well region, said transfer channel being between said first layer and said floating diffusion unit.

2. The solid-state image pickup device according to claim 1, wherein said first conductivity type is N-type and said second conductivity type is P-type.

3. The solid-state image pickup device according to claim 1, wherein said first conductivity type is opposite to said second conductivity type.

4. The solid-state image pickup device according to claim 1, wherein said first well region is between said top surface and said second well region.

5. The solid-state image pickup device according to claim 1, wherein said second well region is between said first well region and said doped region.

6. The solid-state image pickup device according to claim 1, wherein said first layer is between said accumulation layer and said second well region.

7. The solid-state image pickup device according to claim 1, wherein said transfer channel is in physical contact with said accumulation layer and said first layer, said floating diffusion unit being in physical contact with said transfer channel.

8. The solid-state image pickup device according to claim 1, wherein said transfer channel is between a transfer gate electrode and said second well region.

9. The solid-state image pickup device according to claim 1, further comprising:
   a source/drain region of the first conductivity type extending from said substrate surface into said first well region.

10. The solid-state image pickup device according to claim 9, further comprising:
    a power supply electrically connected to said source/drain region, an amplification transistor being configurable to provide an electrical connection and disconnection between a selection transistor and said power supply.

11. The solid-state image pickup device according to claim 10, wherein said floating diffusion unit is electrically connected to a gate electrode of the amplification transistor.

12. The solid-state image pickup device according to claim 10, wherein said selection transistor is configurable to provide an electrical connection and disconnection between said amplification transistor and a vertical signal line.

13. The solid-state image pickup device according to claim 9, wherein a reset channel is a segment of the first well region, said reset channel being between said first layer and said source/drain region.

14. The solid-state image pickup device according to claim 13, wherein said reset channel is in physical contact with said floating diffusion unit and said source/drain region.

15. The solid-state image pickup device according to claim 13, wherein said reset channel is between a reset gate electrode and said second well region.

16. The solid-state image pickup device according to claim 1, wherein a photoelectric conversion element is configured to convert incident light into a photocharge, said photoelectric conversion element comprising said first layer and said accumulation layer.

17. The solid-state image pickup device according to claim 16, wherein an amount of the photocharge is in accordance with an amount of the incident light.

18. An image pickup apparatus comprising:
    the solid-state image pickup device according to claim 16;
    an optical system configured to direct said incident light onto said solid-state image pickup device.

* * * * *